(12) United States Patent
Satoh et al.

(10) Patent No.: US 7,191,610 B2
(45) Date of Patent: *Mar. 20, 2007

(54) ENERGY COLLECTING SYSTEM AND METHOD OF OPERATING THE SAME

(75) Inventors: Koichi Satoh, Chiba (JP); Seiji Yanagisawa, Chiba (JP); Shu Watabe, Yachiyo (JP); Yukihiro Fujita, Narashino (JP); Akio Shima, Tokyo (JP); Yuji Tanaka, Tokyo (JP); Shinichi Takahashi, Chiba (JP); Hiroshi Kunii, Hikata (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/822,102

(22) Filed: Apr. 8, 2004

(65) Prior Publication Data

US 2004/0187497 A1 Sep. 30, 2004

Related U.S. Application Data

(63) Continuation of application No. 10/764,374, filed on Jan. 22, 2004, which is a continuation of application No. 10/233,258, filed on Aug. 30, 2002, now Pat. No. 6,698,223.

(30) Foreign Application Priority Data

Jan. 17, 2002 (JP) ............................. 2002-008369
Mar. 27, 2002 (JP) ............................. 2002-087396

(51) Int. Cl.
*F25B 27/00* (2006.01)

(52) U.S. Cl. ...................... 62/238.7; 237/2 B; 203/11
(58) Field of Classification Search ................ 60/645; 237/2 B; 62/238.7; 203/11
See application file for complete search history.

(56) References Cited

U.S. PATENT DOCUMENTS 3,140,986 A 7/1964 Hubbard
4,246,753 A 1/1981 Redmond (Continued)

FOREIGN PATENT DOCUMENTS

JP 50-049701 4/1975
JP 50-128801 10/1975

(Continued)

OTHER PUBLICATIONS

Tackett, "The Use of Direct Pumping and Hydraulic Turbines in Thermal Storage Systems," Ashrae Transactions, 94:1, 1988, pp. 1989-2007.

*Primary Examiner*—Chen Wen Jiang
(74) *Attorney, Agent, or Firm*—Townsend and Townsend and Crew LLP

(57) ABSTRACT

In the air-conditioning system, a primary side to generate heat includes a heat storage and a heat source and produces cool or warm water using an inexpensive commercial power source such as a nighttime power source. A system collaboration unit is disposed between a motor to drive a water pump and a power source. The unit is connected to the motor via a cable. An output from the inverter is connected to the motor via a cable.

4 Claims, 13 Drawing Sheets

U.S. PATENT DOCUMENTS

| | | |
|---|---|---|
| 4,352,025 A | 9/1982 | Troyen |
| 4,408,127 A | 10/1983 | Santos |
| 4,607,169 A | 8/1986 | Donnelly, Jr. |
| 4,808,837 A | 2/1989 | Matthias et al. |
| 4,918,369 A | 4/1990 | Solorow |
| 4,965,998 A | 10/1990 | Estigoy et al. |
| 6,698,223 B2 | 3/2004 | Satoh et al. |

FOREIGN PATENT DOCUMENTS

| | | | | |
|---|---|---|---|---|
| JP | 51-030144 | | | 3/1976 |
| JP | 63-297949 | | | 12/1988 |
| JP | 03215196 | A | * | 9/1991 |
| JP | 05-010245 | | | 1/1993 |
| JP | 05091751 | A | * | 4/1993 |
| JP | 05-130144 | | | 5/1993 |
| JP | 05308799 | A | * | 11/1993 |
| JP | 11008999 | A | * | 1/1999 |
| JP | 2000182790 | A | * | 6/2000 |
| JP | 2000-291525 | | | 10/2000 |

* cited by examiner

FLOW RATE Q(m³/min)

\<TO START OPERATION\>

1. OPEN WATERWHEEL INLET VALVE, CLOSE WATERWHEEL OUTLET VALVE, AND CLOSE WATERWHEEL BYPASS VALVE

2. POWER HEAT SOURCE

3. POWER MOTOR TO DRIVE PRIMARY COOL/WARM PUMP

4. TRANSMIT REQUEST SIGNAL FROM HEAT SOURCE SIDE TO OPERATE PRIMARY COOL/WARM PUMP

5. RECEIVE OPERATION REQUEST SIGNAL, OPERATE MOTOR TO DRIVE PRIMARY COOL/WARM PUMP, AND TRANSMIT OPERATION ANSWER SIGNAL TO HEAT SOURCE

6. OPERATE HEAT SOURCE WHEN PREDETERMINED PERIOD OF TIME LAPSES AFTER OPERATION ANSWER SIGNAL IS RECEIVED

7. WHEN PREDETERMINED PERIOD OF TIME LAPSES AFTER HEAT SOURCE IS OPERATED, CLOSE WATERWHEEL OUTLET VALVE AND OPERATE WATERWHEEL. OPERATE ELECTRIC POWER GENERATOR

8. SUPPLY GENERATED ELECTRIC POWER VIA INVERTER TO MOTOR TO DRIVE PRIMARY COOL/WARM PUMP

\<TO STOP OPERATION\>

9. CLOSE WATERWHEEL OUTLET VALVE AND STOP WATERWHEEL. STOP ELECTRIC POWER GENERATOR

10. STOP SUPPLYING GENERATED POWER, STOP INVERTER, STOP SUPPLYING POWER TO MOTOR TO DRIVE PRIMARY COOL/WARM PUMP

11. TRANSMIT STOP REQUEST SIGNAL FROM HEAT SOURCE SIDE TO PRIMARY COOL/WARM PUMP SIDE. STOP HEAT SOURCE

12. RECEIVE STOP REQUEST SIGNAL TO STOP MOTOR TO DRIVE PRIMARY COOL/WARM PUMP, STOP PRIMARY COOL/WARM PUMP, AND RETURN STOP ANSWER SIGNAL TO HEAT SOURCE

FIG. 8

<TO START OPERATION>

| 1. | CLOSE WATERWHEEL BYPASS VALVE |
|---|---|
| 2. | POWER HEAT SOURCE |
| 3. | POWER MOTOR TO DRIVE PRIMARY COOL/WARM PUMP |
| 4. | TRANSMIT REQUEST SIGNAL FROM HEAT SOURCE SIDE TO OPERATE PRIMARY COOL/WARM PUMP |
| 5. | RECEIVE OPERATION REQUEST SIGNAL, OPERATE MOTOR TO DRIVE PRIMARY COOL/WARM PUMP, AND TRANSMIT OPERATION ANSWER SIGNAL TO HEAT SOURCE |
| 6. | OPERATE HEAT SOURCE WHEN PREDETERMINED PERIOD OF TIME LAPSES AFTER OPERATION ANSWER SIGNAL IS RECEIVED |
| 7. | WHEN PRESSURE AT WATERWHEEL INLET REACHES PREDETERMINED PRESSURE, AUTOMATIC VALVES IN OUTLET AND THE INLET OF THE WATERWHEEL OPEN, AND WATERWHEEL AND ELECTRIC POWER GENERATOR OPERATE |
| 8. | SUPPLY GENERATED ELECTRIC POWER VIA INVERTER TO MOTOR TO DRIVE PRIMARY COOL/WARM PUMP |

<TO STOP OPERATION>

| 9. | CLOSE AUTOMATIC OUTLET AND INLET VALVES OF WATERWHEEL, STOP THE WATERWHEEL, AND STOP ELECTRIC POWER GENERATOR |
|---|---|
| 10. | STOP SUPPLYING GENERATED POWER, STOP INVERTER, STOP SUPPLYING POWER TO MOTOR TO DRIVE PRIMARY COOL/WARM PUMP |
| 11. | STOP HEAT SOURCE AND TRANSMIT STOP REQUEST SIGNAL FROM HEAT SOURCE SIDE TO PRIMARY COOL/WARM PUMP |
| 12. | RECEIVE STOP REQUEST SIGNAL TO STOP MOTOR TO DRIVE PRIMARY COOL/WARM PUMP, STOP PRIMARY COOL/WARM PUMP, AND RETURN STOP ANSWER SIGNAL TO HEAT SOURCE |

L3/L1=20~30%

ENERGY COLLECTING SYSTEM AND METHOD OF OPERATING THE SAME

BACKGROUND OF THE INVENTION

The present invention relates to an energy collecting system and a method of operating the same in which energy is collected through generation of electric power by a waterwheel using water used by, for example, an air-conditioning load or the like in a building.

For example, as an air-conditioning system in a building, there has been widely employed an air-conditioning system of heat storage type in which a heat source is operated using inexpensive nighttime electric power to store generated heat in a heat storage. In the daytime in which air-conditioning load takes place, the stored heat is fed from the heat storage to the load, i.e., an air conditioner to achieve air-conditioning operation.

FIG. 12 is a diagram showing a configuration of an example of the prior art, namely, an open-loop air-conditioning system of heat storage type. In a primary-side system $S_1$, the configuration includes a water pump 1 which feeds water from a heat storage 16 to supply the water via a water supply pipe 4a to a heat source 4 and a both-end motor 2 of which one shaft end is directly coupled with the water pump using a shaft coupling to drive the water pump. The other shaft end is coupled with a waterwheel 12 via a clutch 12b. The waterwheel is disposed at a position at which potential energy of water discharged from the heat source can be completely collected. Numerals 18 and 19 indicate electric power sources, numeral 5 is a two-way valve to adjust a quantity of heat generated by the heat source, numeral 6a is a water supply pipe connecting the heat source to the waterwheel, and numeral 6 is an expansion tank associated with the water supply pipe. The tank 6 breaks a siphon to apply a head of the supplied water (potential energy thereof) to the waterwheel. In place of the expansion tank, a vacuum breaking valve may be disposed depending on cases. Numeral 12c indicates a water supply pipe to return the water from the waterwheel to the heat storage. That is, the water supplied to the heat source 4 by the water pump 1 is heated by the heat source and is then fed to the waterwheel 12. The waterwheel 12 is operated by the potential energy of the water to generate power and then imparts the power to the both-end motor 2. The load of the motor becomes lower than that of the water pump, the discrepancy therebetween corresponds to the power imparted from the waterwheel. The water from the waterwheel then returns to the heat storage.

The secondary-side system $S_2$ is a load of an air conditioner or the like and supplies water from the heat storage 16 via a water supply pipe 7a to an air han (air handling unit) 8 and a fan coil 9 by a pump 7. The air han 8 includes an adjusting valve 8a to adjust a quantity of heat. The fan coil 9 also includes a similar adjusting valve 9a. The water of which heat is radiated is returned via the water supply pipe 7b to the heat storage 16.

FIG. 13 shows an operating characteristic graph of a pump and a waterwheel in an example of the prior art. A total water pumping-up process of the pump, an effective head of the waterwheel, and power of the pump and the waterwheel are indicated along an ordinate. A water flow rate is indicated along an abscissa. A curve A is a curve of Q,H performance of the pump and a curve C is a curve of shaft power when the waterwheel is not operated. The total water pumping-up process is required to operate only the water pump to supply water at a flow rate of Q0 to the water supply system shown in FIG. 9. The operation point in this operation is point O4 on the curve A. Power consumed in this operation is L1 indicated by pump shaft power, and the operation point is point O1 on the curve C. A curve B indicates an effective head of the waterwheel (pressure head difference between the inlet and the outlet of the waterwheel). This means that when water flows at a flow rate of Q0, a pressure head difference (effective head) of H1 occurs between the inlet and the outlet of the waterwheel, and this potential energy is absorbed to generate power as below.

A curve D is a power curve when the water pump and the waterwheel are operated. Power consumed in the operation is L2 indicated by pump shaft power and the operation point is point O2 on the curve D. That is, when the flow rate is Q0, power generated by the waterwheel is L3.

In this case, the power collection ratio (L3/L1) is about 20% to about 30%.

In this way, the conventional apparatus effectively uses potential energy of the pumped-up water passed through the heat source.

For example, JP-A-50-128801 (a power collection pumping machine) and JP-A-50-49701 (a power collection pumping machine) describes known examples of this apparatus. However, the prior art technique uses a clutch to directly couple a motor with a waterwheel and there is a problem of improvement of transfer efficiency of the clutch. There exists another problem. That is, the energy collected by the waterwheel is power and there is a problem that the power cannot be used in this case, in consideration of structure, for any other load in the building. JP-A-5-10245 (an electric power generator using waterwheel of paddle-wheel type) is a known example of waterwheel electric power generation using a waterwheel in a dam, a paddy field, or a watercourse.

SUMMARY OF THE INVENTION

It is therefore an object of the present invention to collect unused energy in a building by waterwheel electric power generation to use the energy again.

According to the present invention, there is provided an energy collecting system comprising as basic units a heat storage disposed in a lower section of a building; a heat source disposed in an upper section of the building for imparting heat to water supplied from the heat storage by electric power from a commercial power source and thereby producing cool or warm water; a primary cool/warm water pump for pumping up the water from the heat storage and supplying the water via a sucking pipe to the heat source; a water supply pipe disposed between a discharge outlet of the primary cool/warm water pump and the heat source; a water supply pipe for returning water from a discharge outlet of the heat source to the heat storage; an expansion tank or a vacuum breaking valve disposed in a highest section of the water supply pipe; a waterwheel disposed in a lowest section of the water supply pipe for collecting potential energy of the water discharged from the heat source; an electric power generator rotated by torque generated by the waterwheel to generate electric power; an inverter connected to an output port of the electric power generator for converting a voltage and a frequency of electric power generated by the electric power generator into a desired voltage and a desired frequency; a system collaboration unit between the motor and a commercial power source for changing a system from the power source to a side of the motor or from the inverter to a side of the commercial power source; and a cable for connecting an electric path between the system collaboration unit and the motor to an output port of the inverter.

<To Start Operation>
1) Before operation, close a waterwheel inlet valve, a waterwheel outlet valve, and a waterwheel bypass valve. First, turn on power of the heat source and power of the motor to drive the primary cool/warm pump.
2) Next, transmit an operation request signal from the heat source side to the primary cool/warm pump.
3) The primary cool/warm pump receives the operation request signal transmitted from the heat source side to start its operation and supply water from the heat storage to the load side. Simultaneously, the pump transmits an operation answer signal to the heat source.
4) After the operation answer signal is received, when a predetermined period of time lapses enough to guarantee a water supply pressure, the heat source starts its operation.
5) When a predetermined period of time lapses after the heat source starts its operation, the waterwheel outlet and inlet valves are opened. In association therewith, the waterwheel starts its operation. The rotation speed of the waterwheel increases with a lapse of time and the electric power generator starts its operation.
6) Generated power is supplied via the inverter to a load, for example, the motor to drive the primary cool/warm pump. In another embodiment, the system collaboration unit is connected to a commercial power source and there is provided a unit to connect an output from the inverter to an electric path between the system collaboration unit and a load. In this case, when the load is in a low state and the generated power is excessive, unused power is fed back via the system collaboration unit to the power source.
7) The expansion tank or the vacuum breaking valve is disposed in an upper section of the water supply pipe and includes an atmospheric opening or a function similar to that of the atmospheric opening. The tank or the valve prevents expansion of water in the water supply pipe and breaks a vacuum state by exhausting air from the pipe or by sucking external air therein to help the supplied water fall onto the waterwheel.

In another embodiment, a pressure sensor disposed in the vicinity of the waterwheel senses pressure at the position. When the water pressure becomes equal to or more than a predetermined value, an automatic valve disposed in the vicinity of the waterwheel is opened.

<To Stop Operation>
8) When a predetermined period of time lapses after the heat source starts its operation, close the waterwheel outlet valve and stop the waterwheel. Stop the electric power generator.
9) Stop supplying the generated power, stop the inverter, stop supplying power to the motor to drive the primary cool/warm pump.
10) Transmit a stop request signal from the heat source side to the primary cool/warm pump side.
11) Receive the stop request signal, stop the motor to drive the primary cool/warm pump, and return a stop answer signal to the heat source.
12) Interrupt the power to the motor to drive the primary cool/warm pump and interrupt the power to the heat source.

According to the present invention, there is provided an energy collecting system in a building, wherein a water pump on a secondary-side system to supply water to a group of air-conditioning loads is driven by an inverter, a waterwheel is operated by potential energy of water used by the air-conditioning loads, an electric power generator is operated by torque generated by the waterwheel, power generated by the electric power generator is converted by a regenerative converter into direct-current (dc) power, and positive-side dc power P thereof and negative-side dc power N thereof are outputted to dc terminals P and N of an inverter for the water pump.

The system of the present invention is configured as above and operates as follows.
1) Before operation, the waterwheel inlet and outlet valves and the waterwheel bypass valve are closed. First, the inverter to drive the water pump in the secondary-side system is activated to operate the water pump to supply water to air conditioners as air-conditioning loads. The inverter receives a sense signal from a pressure sensor disposed on the pump discharge side to conduct, for example, control operation to fix a terminal pressure.
2) The waterwheel starts its operation when the water having passed the respective air conditioners flows thereonto. The electric power generator starts its operation by torque generated by the waterwheel to generate electric power.
3) The inverter on the electric power generator side converts power (alternating current) generated by the electric power generator into dc power to supply the dc power to another inverter via a cable.

The present invention is not limited to a system or a facility arranged in a building. That is, the configuration includes a heat storage for storing water fed from a heat source, a heat source for producing cool or warm water using water supplied from the heat storage, a pump for supplying the water from the heat storage to the heat source, a motor for driving the pump, a waterwheel rotated by the water supplied from the heat source, an electric power generator driven by the waterwheel for generating electric power, an inverter connected to an output port of the electric power generator, a system collaboration unit disposed between the motor and a commercial power source for conducting a change-over operation between a system connecting the commercial power source to the motor and a system connecting the inverter to the commercial power source, and a connecting line for connecting an electric path between the system collaboration unit and the motor to an output port of the inverter.

Other objects, features and advantages of the invention will become apparent from the following description of the embodiments of the invention taken in conjunction with the accompanying drawings.

BRIEF DESCRIPTION OF THE DRAWINGS

FIG. 7 is a flowchart of a sixth embodiment of the present invention, FIG. 8 is a flowchart of a seventh embodiment of the present invention.

DESCRIPTION OF THE EMBODIMENTS

Next, description will be given of an embodiment of the present invention by referring to FIGS. 1 to 11.

Figure 1:
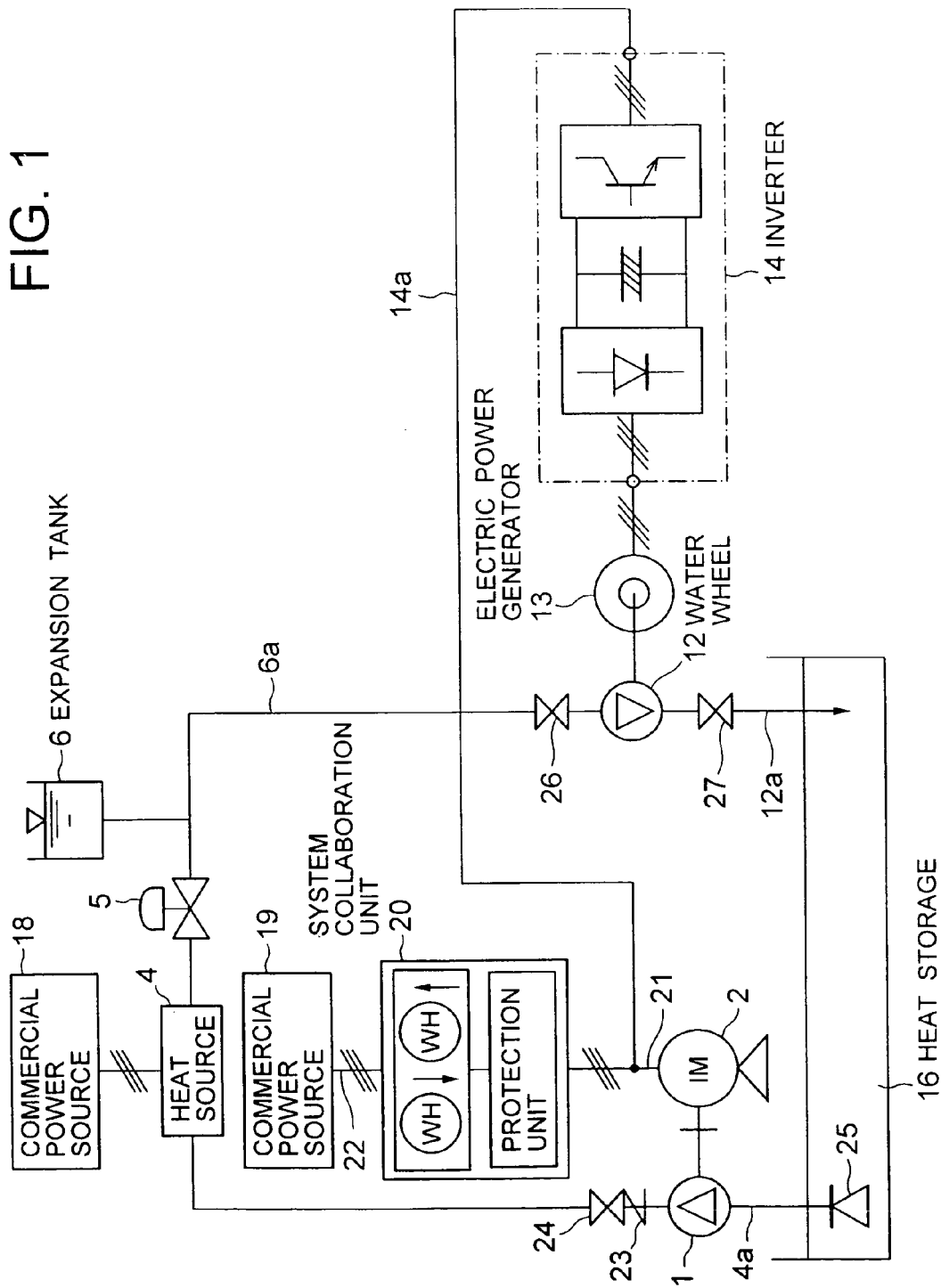
FIG. 1 is a diagram showing a configuration of a first embodiment of the present invention.
Figure 9:
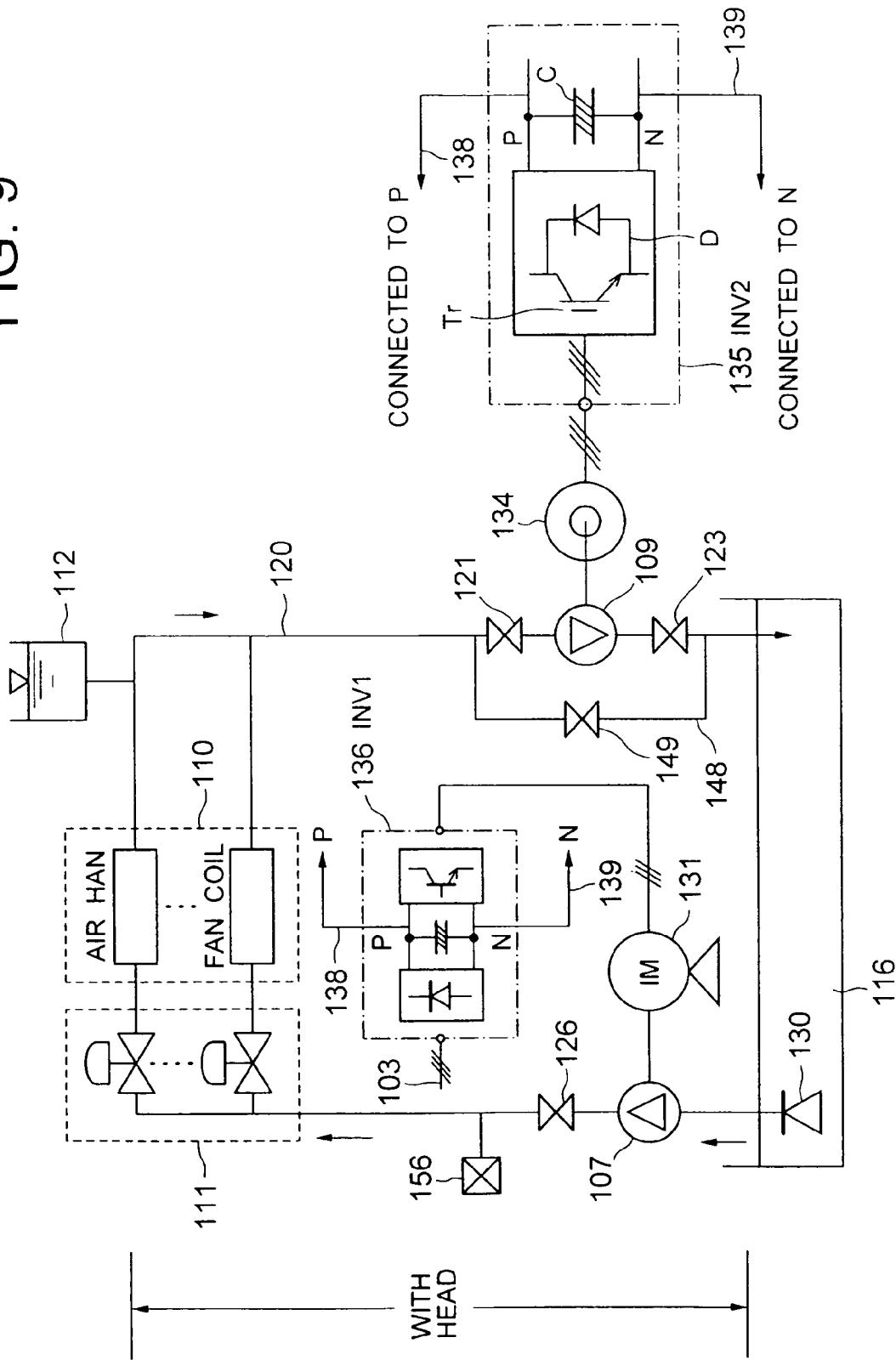
FIG. 9 is a diagram showing a configuration of an eighth embodiment of the present invention.

FIG. 1 shows a configuration of a first embodiment of the present invention. In this diagram, when compared with FIG. 9 showing a prior art example, the both-end motor is replaced with a general motor (a non-both-end motor), the water pump is separated from the waterwheel, an electric power generator is disposed in the waterwheel (or an integral type of these units is also available), and an inverter is connected to an output port of the electric power generator. A system collaboration unit 20 is disposed between a motor 2 to drive the water pump 1 and a power source 19. The system collaboration unit 20 is connected via a cable 21 to the motor 2. Furthermore, an output of the inverter is connected via a cable 14a to the motor 2. When the waterwheel is not operating, the system collaboration unit 20 operates to supply power from a commercial power source 19 to the motor 2. When the waterwheel is operating and power generated by the electric power generator 13 is insufficient according to a load state of the water pump 1, the system collaboration unit 20 operates to supply power obtained by adding power from the commercial power source to the power generated by the electric power generator 13. When there remains unused power in the generated power, the unused power is returned from the inverter to the commercial power source via the system collaboration unit. The units or devices assigned with the same reference numerals are the same as those of FIG. 9, and hence description thereof will be avoided.

Figure 2:
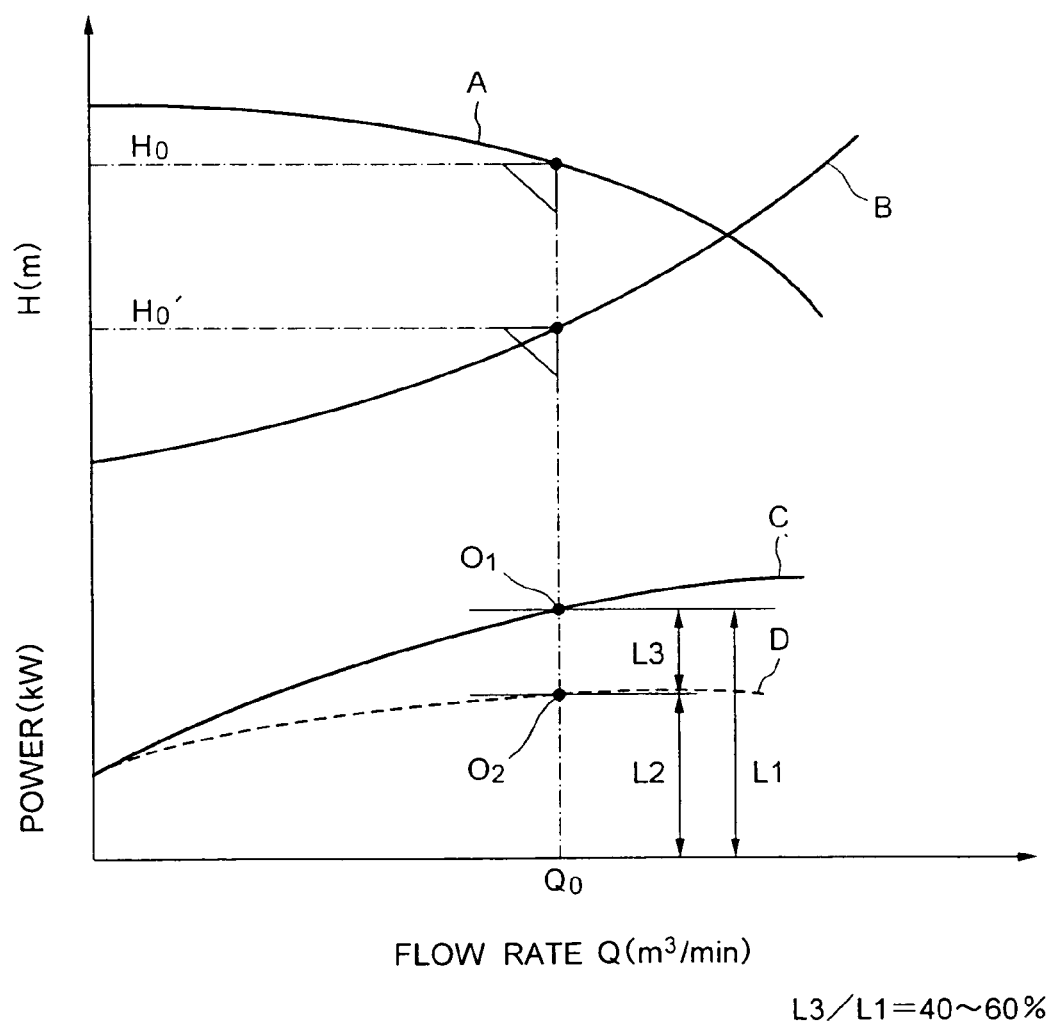
FIG. 2 is a graph showing an operating characteristic of a pump and a waterwheel of the first embodiment of the present invention.

FIG. 2 shows an operating characteristic of the pump and the waterwheel of the first embodiment of the present invention. The components assigned with the same reference numerals are the same as those of FIG. 10 and hence description thereof will be avoided. In operation of the first embodiment of the present invention, to obtain the shaft power L1 for the water pump flow rate Q0, power L3 generated by a combination of "waterwheel-electric power generator-inverter" and power L2 from the commercial power source are used. In other words, an insufficient power of the power generated by the waterwheel is supplied from the commercial power source via the system collaboration unit. Naturally, when the opening of two-way valve is choked and the load on the water pump is reduced, the electric power to drive the motor becomes less than the power generated by the waterwheel depending on cases. In this case, unused electric power is returned from the inverter via the system collaboration unit to the power source side. In the present embodiment, the power collection ratio (L3/L1) is about 40% to about 60% and is improved when compared with the power collection ratio of the prior art.

Figure 3:
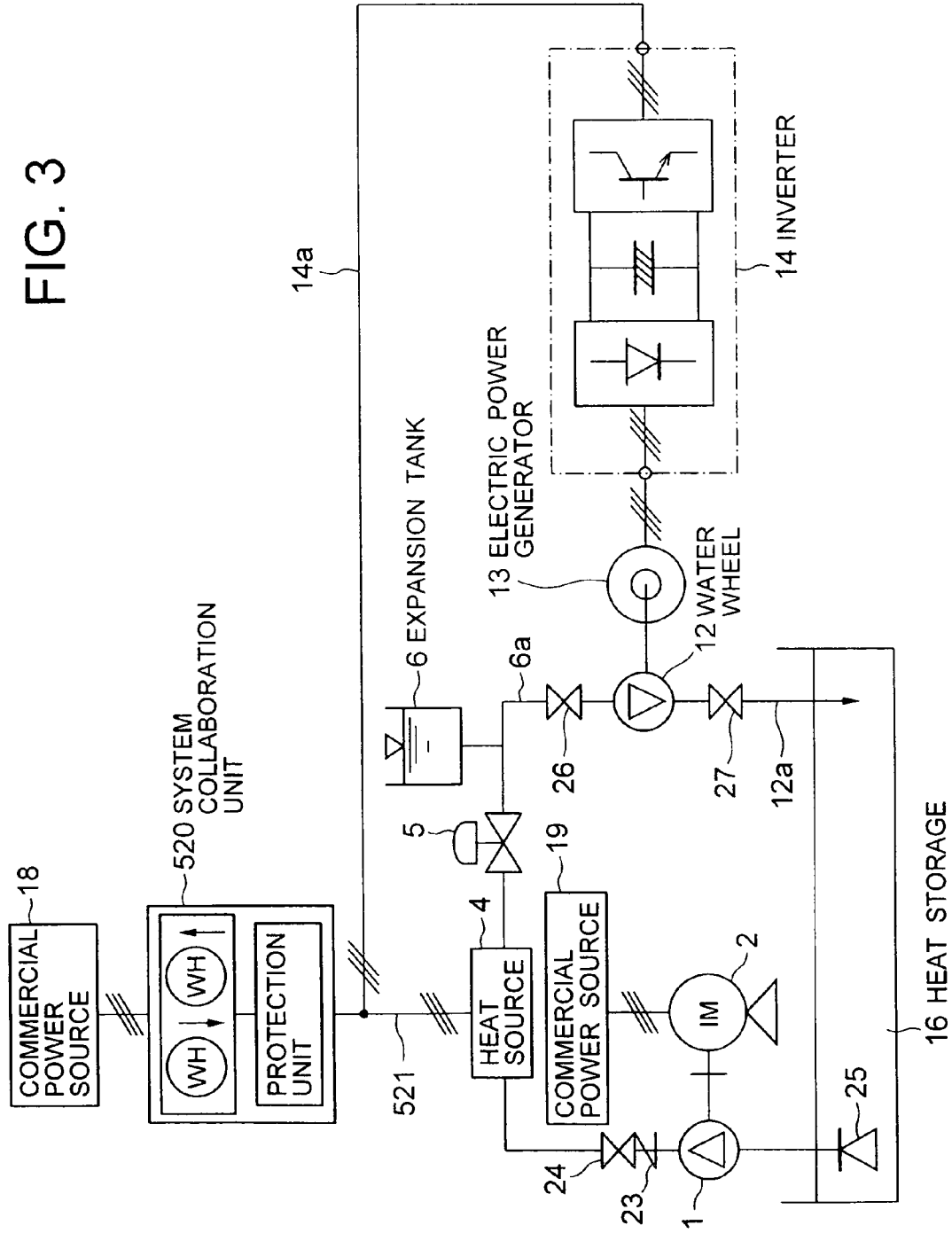
FIG. 3 is a diagram showing a configuration of a second embodiment of the present invention.

Description will be given of a second embodiment by referring to FIG. 3. In the embodiment, as compared with the first embodiment, the load of the electric power generator is changed from the motor to drive the primary cool/warm pump to the heat source. In FIG. 3, numeral 520 is a system collaboration unit disposed between the commercial power source 18 and a power source terminal of the heat source 4. An output from the inverter 14 is connected via a cable 14a to an electric path 521 of the system collaboration unit. That is, when the waterwheel is not operating, the system collaboration unit 520 operates to supply power from the commercial power source 18 to the heat source 4. When the waterwheel is operating and if power generated by the electric power generator 13 is insufficient according to a load state of the heat source 4, the system collaboration unit 520 operates to supply power obtained by adding the power generated by the electric power generator 13 to the power from the commercial power source 18. If there remains unused power in the power generated by the power generator 13, the unused power is returned from the inverter via the system collaboration unit to the commercial power source.

Figure 4:
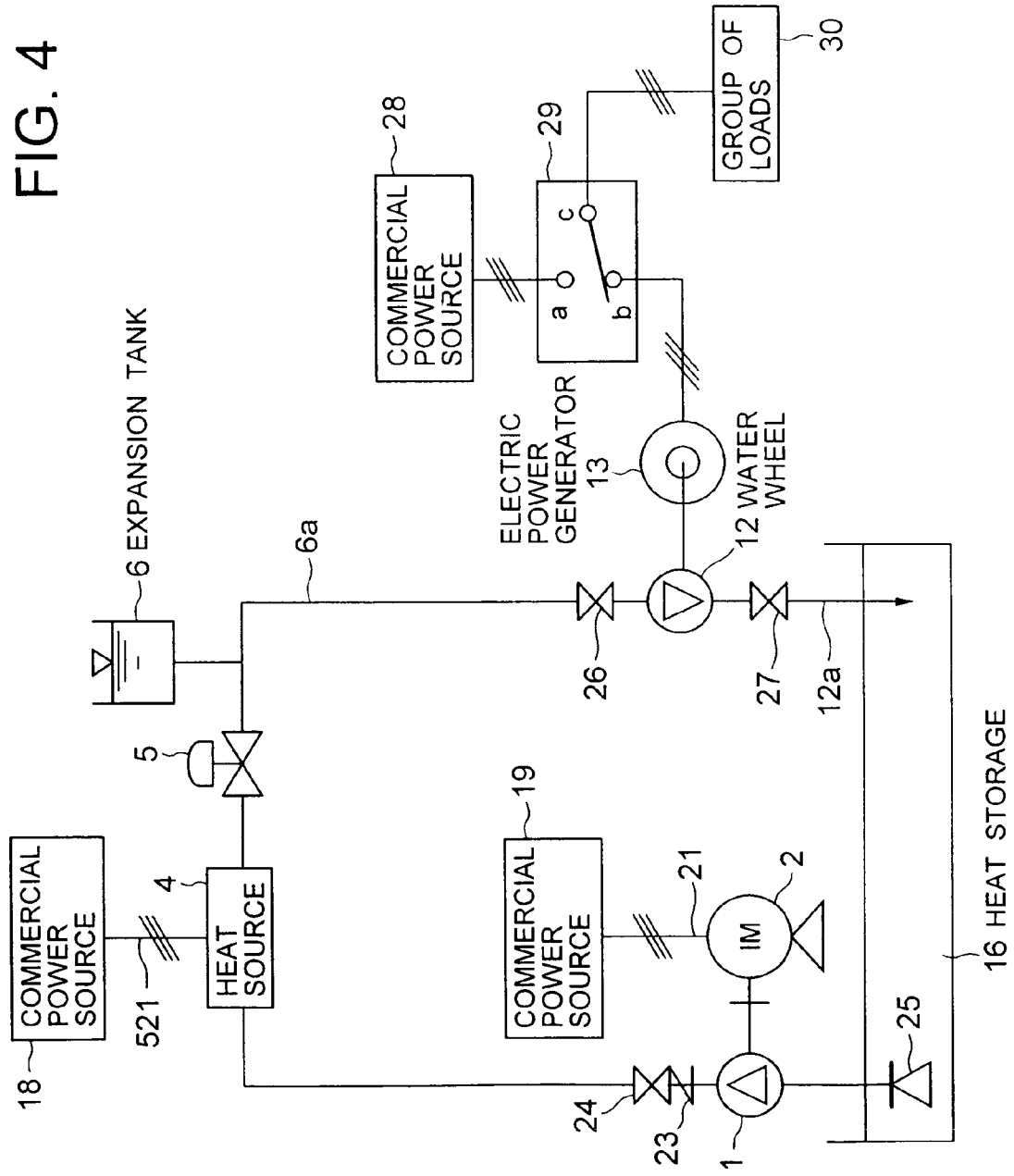
FIG. 4 is a diagram showing a configuration of a third embodiment of the present invention.

Description will be given of a third embodiment by referring to FIG. 4. In this embodiment, power generated by the waterwheel is supplied to a group of various loads such as lighting apparatuses in a building. In FIG. 4, numeral 30 indicates a group of various loads such as lighting apparatuses in a building and numeral 29 is a power system change-over unit. When the change-over unit 29 is set to a c–a side, the group of loads is connected to the commercial power source. When the change-over unit 29 is set to a c–b side, the group of loads is connected to the electric power generator side. That is, when the waterwheel is operating and if the power generated by the electric power generator 13 is sufficient according to a load state of the group of loads 30, the change-over unit 29 is set to a c–b side to supply power generated by the electric power generator 13. When the power generated by the electric power generator 13 is insufficient, the change-over unit 29 is set to a c–a side to supply power from the commercial power source.

Figure 5:
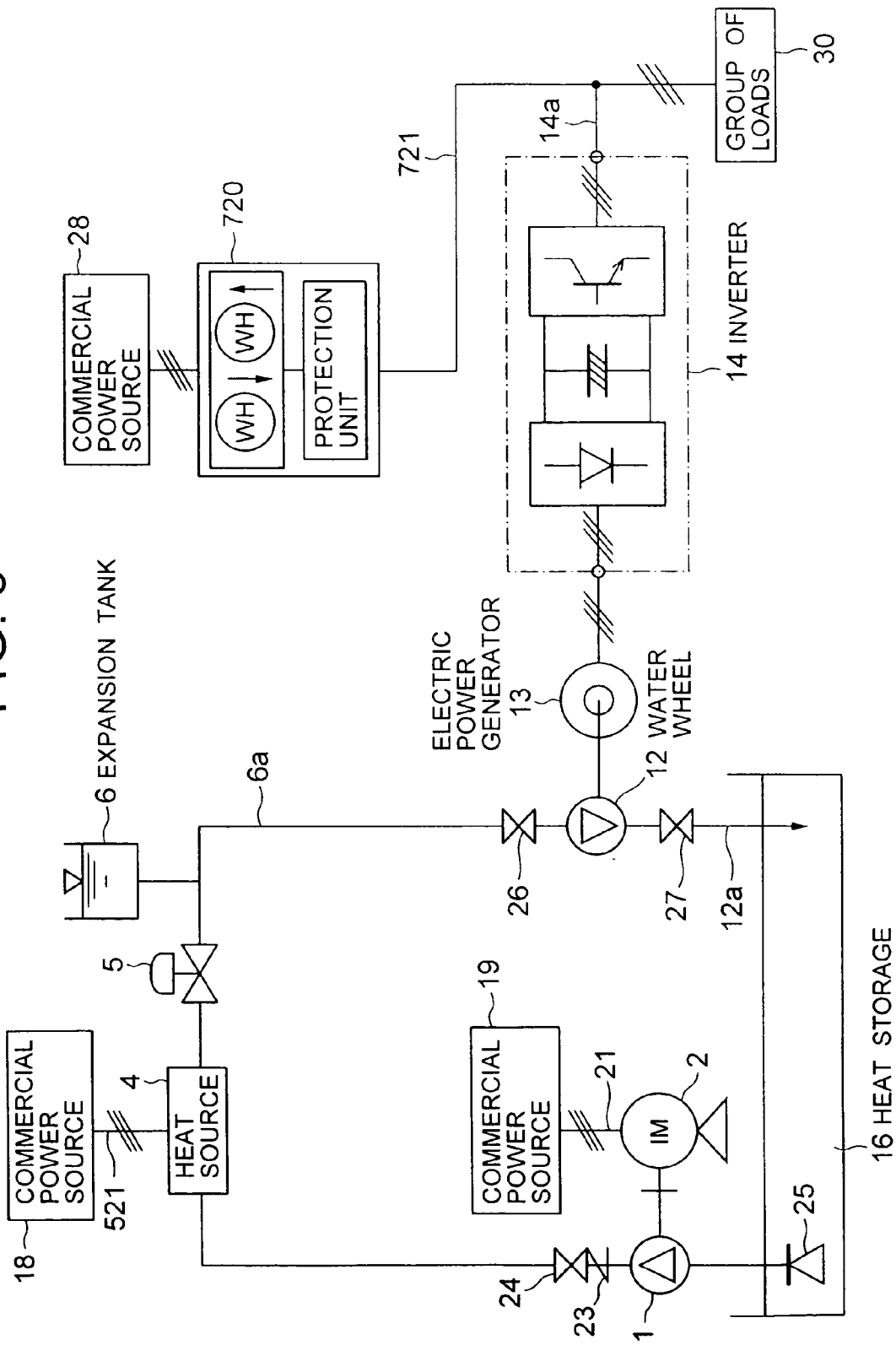
FIG. 5 is a diagram showing a configuration of a fourth embodiment of the present invention.

A fourth embodiment will be described by referring to FIG. 5. In this embodiment implemented by further modifying the third embodiment, when the group of loads imposes a high load and the power generated by the electric power generator 13 is insufficient, the power from the electric power generator 13 is added to that from the commercial power source. In FIG. 5, as compared with FIG. 6, the group of loads 30 can be powered from the electric power generator 13 and from the commercial power source 28. An inverter 14 is connected to the electric power generator 13, a system collaboration unit 720 is connected between the commercial power source 28 and the group of loads 30, and a cable 14a connects an electric path connecting the system collaboration unit 720 to a power source terminal of the group of loads 30 to an output from the inverter.

In the configuration, when the generated power is insufficient, there is supplied power obtained by adding the generated power to that from the commercial power source.

Figure 6:
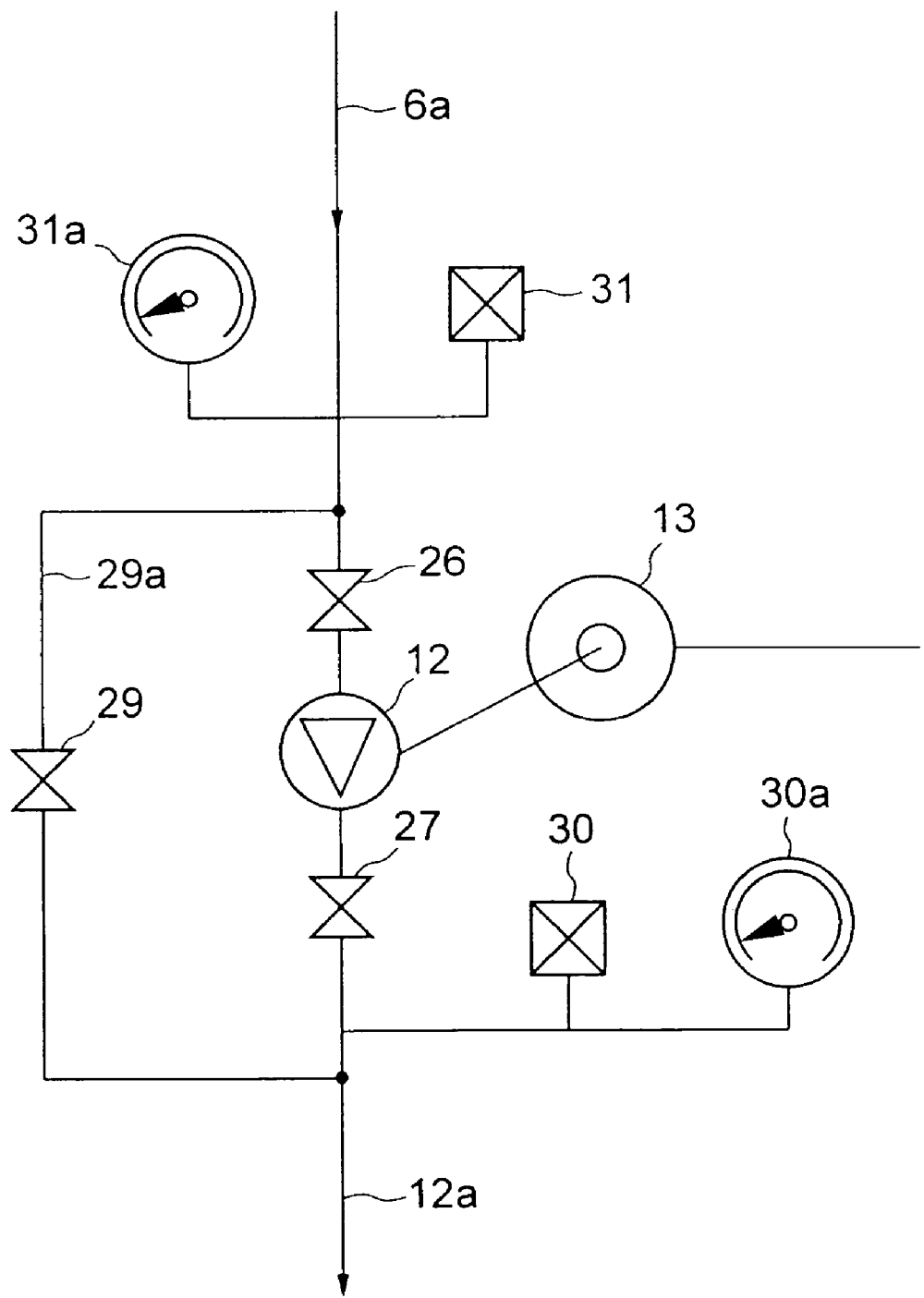
FIG. 6 is a diagram showing a configuration of a fifth embodiment of the present invention.

Description will now be given of a fifth embodiment by referring to FIG. 6. In the embodiment, a bypass pipe 29a and a bypass valve 29 are arranged to bypass valves before and after the waterwheel 12 and a pressure gauge 31a and a pressure sensor 31 are disposed on the inlet side of the waterwheel and a pressure gauge 30a and a pressure sensor 30 are disposed on the outlet side of the waterwheel. In this configuration, to maintain the waterwheel 12, the electric power generator 13, and units associated therewith, the gate valves 26 and 27 are closed and the gate valve 29 is opened to return the water having passed the heat source to the heat storage via the water supply pipe 6a, the bypass pipe 29a, and the valve 29 in this sequence. As a result, the heat source can be operated also during maintenance of the waterwheel 12, the electric power generator 13, and units associated therewith.

Description will be given of a sixth embodiment by referring to FIG. 7. In the embodiment, although not shown, the operations and control procedures are specified for the controller of the heat source, the motor to drive the primary cool/warm water pump, the electric power generator, the inverter, and the units as loads such that these constituent components collaboratively conduct operations. FIG. 7 shows the operations and control procedures in a flowchart. That is, to start operation, the inlet valve of the waterwheel is opened, the outlet valve thereof is closed, and the bypass valve thereof is closed in step 1. In step 2, the heat source is powered. The motor to drive the primary cool/warm water pump is powered in step 3. In step 4, an operation request signal is transmitted from the heat source side to the primary cool/warm water pump. In step 5, the primary cool/warm water pump receives the operation request signal and operates the motor to drive the primary cool/warm water pump. The pump then sends an operation answer signal to the heat source. In step 6, when a predetermined period of time lapses after the heat source receives the answer signal indicating the operation of the motor to drive the primary cool/warm water pump, the heat source starts its operation. In step 7, when a predetermined period of time lapses after the heat source starts its operation, the waterwheel outlet valve is opened. As a result, the waterwheel starts its operation and the electric power generator also starts its operation. In step 8, power generated by the electric power generator is supplied via the inverter to the primary cool/warm water pump. Next, to stop operation, the waterwheel outlet valve is closed in step 9 to stop the waterwheel. This stops the electric power generator.

In step 10, the system stops supplying the generated power and stops the inverter. The system then stops supplying power to the motor to drive the primary cool/warm water pump. In step 10, a stop request signal is sent from the heat source side to the primary cool/warm water pump side and the heat source stops its operation. In step 11, the motor to drive the primary cool/warm water pump receives the stop request signal and stops its operation. In step 12, the motor returns a stop answer signal to the heat source. In addition, the system turns off power to the motor and power to the heat source. In the description of the embodiment, the motor to drive the primary cool/warm water pump is used as an example of the load of the electric power generator. However, the load may be a heat source or another load such as a lighting apparatus in a building. By specifying the operations and the control procedures as above, the respective constituent components can be operated in an appropriate collaborative fashion to achieve predetermined performance and functions without errors.

Description will now be given of a seventh embodiment by referring to FIG. 8. The embodiment is implemented by further modifying the sixth embodiment to conduct an automatic and collaborative operation. Therefore, the gate valves 26, 27, and 29 of FIG. 6 are modified to automatic valves. Although not shown, the operations and control procedures are specified for the controller of the heat source, the motor to drive the primary cool/warm water pump, the electric power generator, the inverter, and the units as loads such that these constituent components automatically and mutually conduct operations in a collaborative way.

FIG. 8 shows the operations and the control procedures in a flowchart. To enable automatic operation, step 7 is added to FIG. 7 to open the waterwheel outlet and inlet valves when the waterwheel inlet pressure becomes equal to or more than a predetermined pressure to automatically operate the waterwheel 12, the electric power generator 13, and units associated therewith. In a phase to stop operation, step 9 is similarly added to FIG. 7 to close the waterwheel outlet and inlet valves to automatically the waterwheel 12, the electric power generator 13, and units associated therewith. The other operations are the same as those of FIG. 7 and hence description thereof will be avoided. Through the operation, the operation management becomes easier without any risk of erroneous operations.

As a further improvement of the embodiment, the open control condition of the waterwheel inlet and outlet valves during the operation includes that the heat source is operating and the inlet valve pressure is equal to or more than a predetermined pressure. When both conditions are satisfied, the open control is carried out. As a result, the operation is guaranteed and the overall system operates in a collaborative way.

FIG. 9 shows a configuration of a specific embodiment of the present invention. In this diagram, when compared with the prior art example, the both-end motor 2 is replaced with a general motor 131 (a non-both-end motor) to separate the water pump 107 from the waterwheel 109 in the secondary-side system to supply water to air-conditioning loads. An electric power generator 134 is disposed in the waterwheel 109 (or an integral type of these units is also available). An inverter 135 (INV2) is connected to an output port of the electric power generator 134. Power generated by the power generator 134 is converted into a dc voltage by the inverter 135 including semiconductor devices such as a power transistor Tr and a flywheel diode D. The power is then smoothed by a capacitor C. For example, when the ac voltage generated by the electric power generator 134 is 200 V, the voltage (dc voltage) between the P and N terminals of the inverter 135 is 280 V. The inverter 135 is well known, for example, is an inverter using pulse width modulation (PWM) control and hence detailed description thereof will be avoided. The positive side P and the negative side N of the dc voltage output from the inverter 135 are respectively connected to the positive side P and the negative side N of a dc intermediate circuit of an inverter 136 (INV1)to drive the motor 131. The inverter 136 is also well known and is, for example, an inverter using PWM control and hence detailed description thereof will be avoided.

In the system configured as above, when the air-conditioning load varies, the flow rate of water supplied to the waterwheel 109 inevitably varies and the power generated by the electric power generator 134 also varies. In this case, for example, each time the P-N voltage sensed between the terminals P and N as described above is lower than 280, if the operating frequency of the inverted 135 is lowered, a regenerative state takes place and the P-N voltage increases although not shown in the diagram.

The motor 131 to drive the water pump 107 is driven by the inverter 136. The inverter 136 is used because when the air-conditioning load varies, an energy saving operation is conducted by accordingly lowering the rotary speed of the pump. The dc voltage terminals P and N of the inverter 135 are respectively connected to the dc voltage terminals P and N of the inverter 136 using cables 138 and 139, respectively. As a result, the power generated by the electric power generator 134 can be supplied using a direct current to the inverter 136 on the water pump side. Therefore, it is not required to convert the power into an alternating current, and a simple and inexpensive configuration can be implemented without requiring a system collaboration unit.

Figure 10:
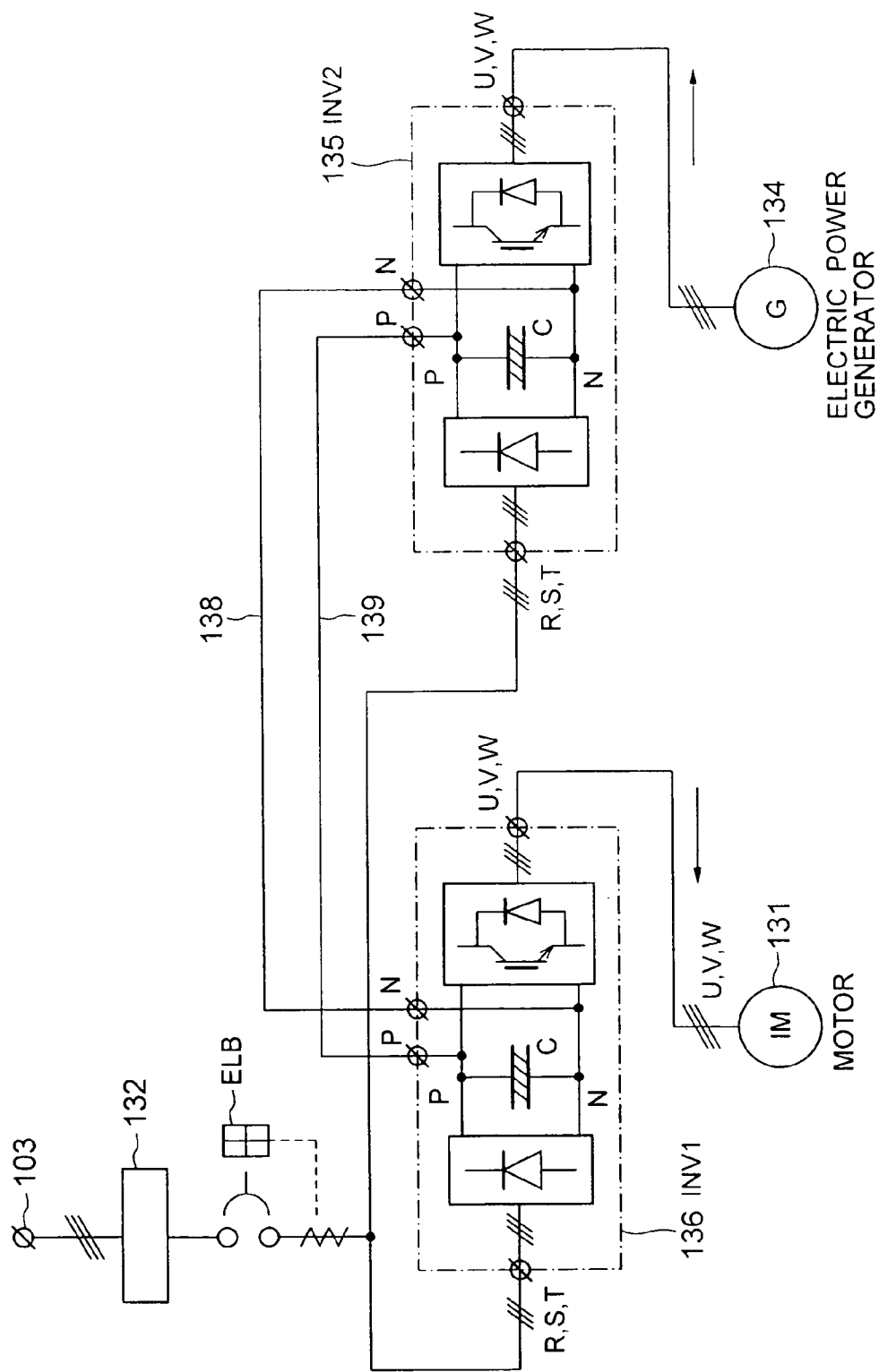
FIG. 10 is a diagram showing an electric system of the eighth embodiment of the present invention.

FIG. 10 shows an electric system of FIG. 9. The constituent components assigned with the same reference numerals are the same as those shown in FIG. 1, and hence description thereof will be avoided. In the diagram, numeral 103 indicates a commercial power source, numeral 132 is a wattmeter, and ELB indicates an electric leakage breaker. In an initial state of operation, since the waterwheel 109 and the electric power generator 134 are not operating, power is not supplied from the dc voltage terminals P and N of the inverter 135. The water pump 107 and the motor 131 are driven by the inverter 136 using power only from the commercial power source 103. Water is supplied by the operation of the water pump 107 to each air-conditioning load 110. When the water used by the load returns to the waterwheel 109, the waterwheel 109 and the electric power generator 134 start operation to supply dc power from the inverter 135 via the cables 138 and 139 to the dc voltage terminals P and N of the inverter 136.

Figure 11:
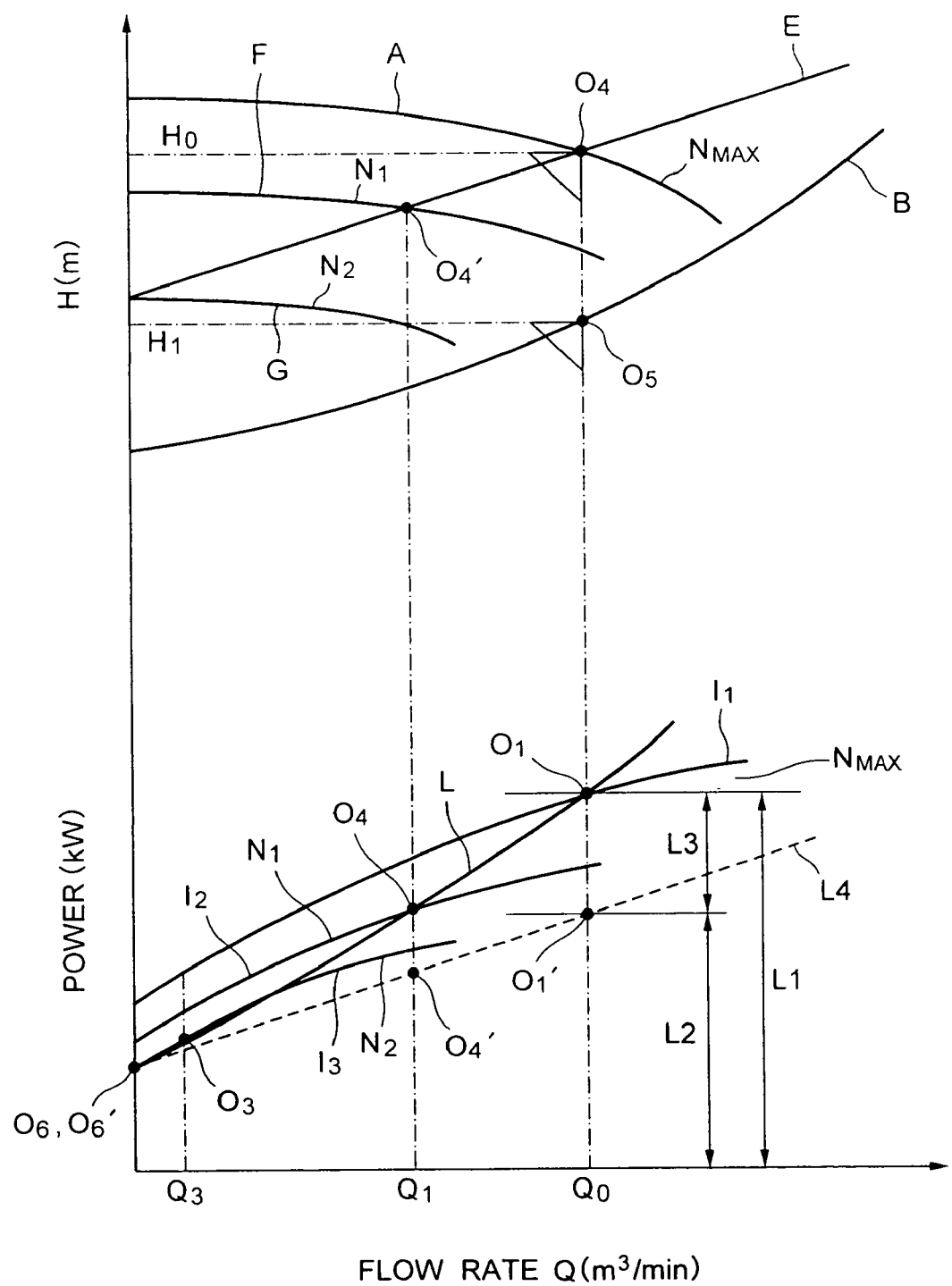
FIG. 11 is a graph showing a characteristic of the eighth embodiment of the present invention.
Figure 12:
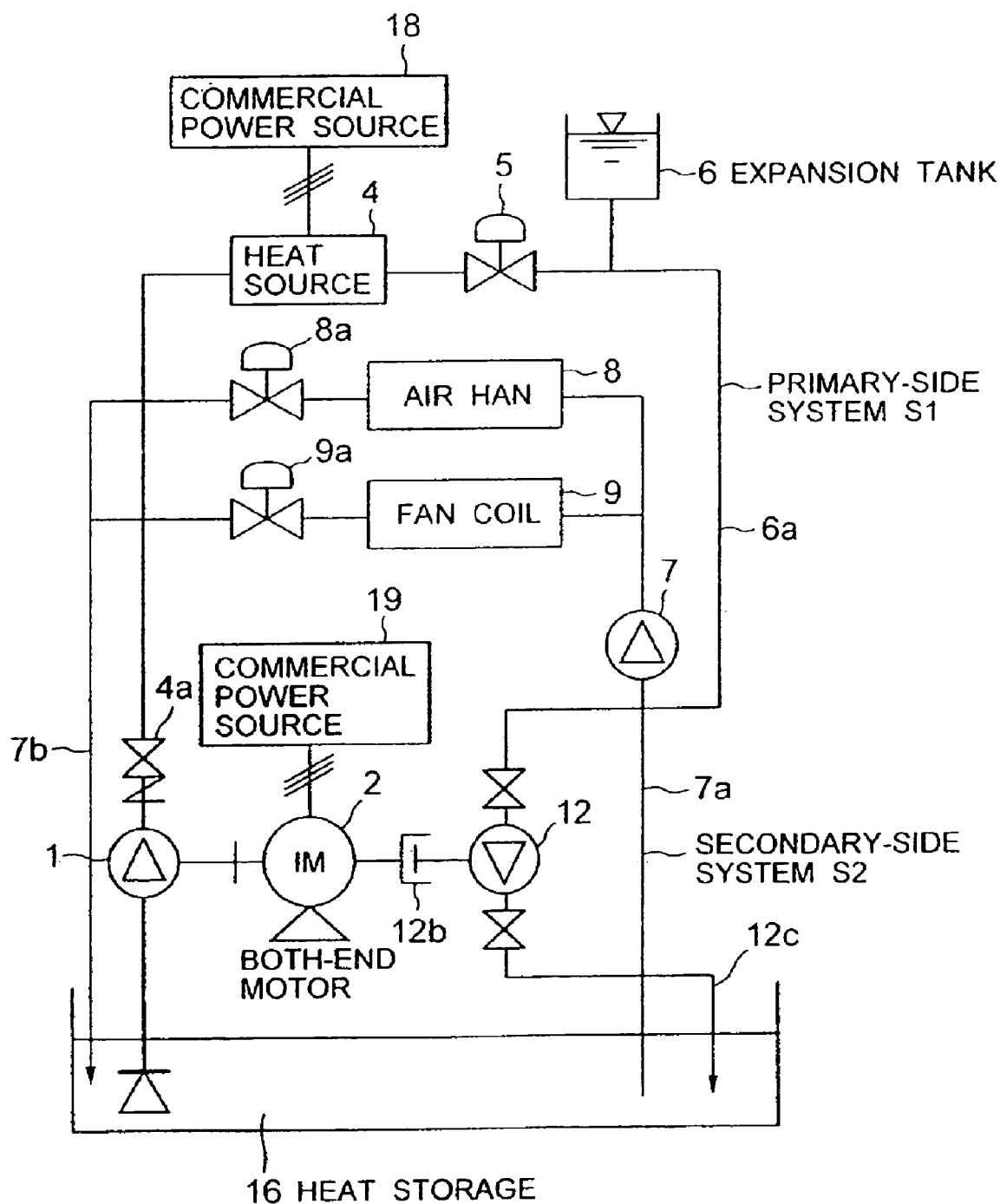
FIG. 12 is a diagram showing a configuration of a system of the prior art.
Figure 13:
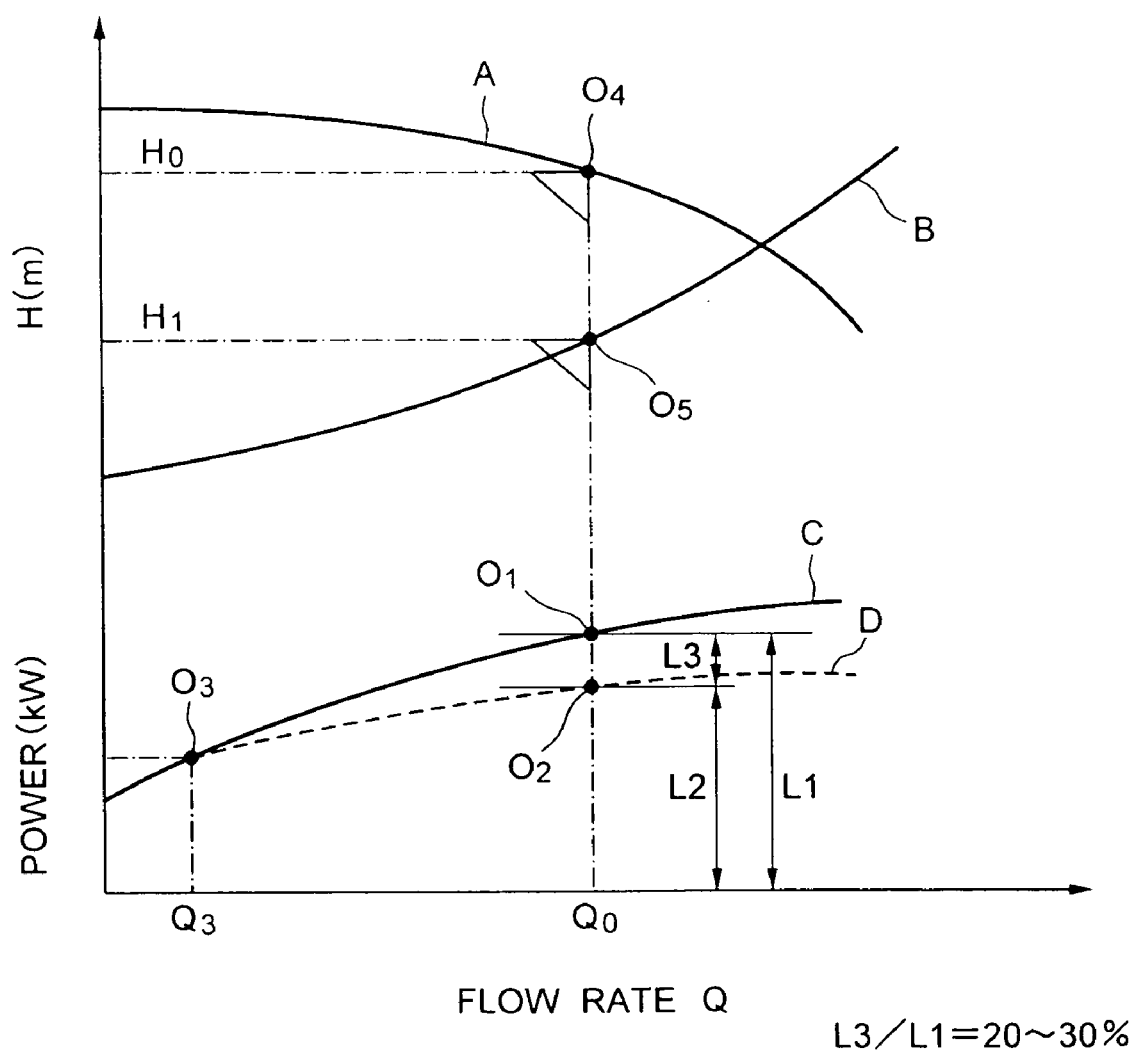
FIG. 13 is a graph showing an operating characteristic of a pump and a waterwheel of the prior art.

FIG. 11 shows a graph of an operating characteristic of the water pump 107 and the waterwheel 109 in the embodiment of the present invention. In this case, the water pump 107 is controlled by the inverter 136 to keep a terminal pressure at a fixed value (the rotary speed of the pump is controlled to keep the terminal pressure of the pipe at a fixed value such that a pump discharge pressure is on a pipe resistance curve E). The items assigned with the same reference numerals are the same as those of FIG. 5, and hence description thereof will be avoided. In the embodiment of the present invention, to obtain shaft power L1 at a flow rate of $Q_0$ by operating the water pump 107 with a highest frequency of Nmax of the inverter 136, there is used power obtained by adding power L3 generated by a combination of the waterwheel 109, the electric power generator 134, and the inverter 135 to mechanical power (electric power) L2 from the commercial power source. In other words, power insufficient in the power generated by the waterwheel is supplied from the commercial power source 103. Naturally, when the air-conditioning load is decreased and the load of the water pump 107 is lowered and the flow rate becomes $Q_1$, the water pump 107 is operated with a frequency of $N_1$ of the inverter 136 and has performance on the curve F. The shaft power is indicated by a curve $I_2$ and the operation points are respectively $O_4$ and $O_4'$. When the flow rate becomes zero, the inverter 136 is operated by a frequency of $N_2$, and the water pump 107 has performance on a curve G. The shaft power is indicated by a curve $I_3$ and the operation points are respectively $O_6$ and $O_6'$. When the waterwheel 109 is not operated, the operation is conducted on a curve L connecting the points $O_1$, $O_4$, and $O_6$ of the shaft power. In operation of the waterwheel 109, when water flows onto the waterwheel 109 at a flow rate of $Q_0$, there appears a head $H_0$ between the inlet and the outlet of the waterwheel. Therefore, the waterwheel generates torque using potential energy of the water, and power is generated by the electric power generator 134 corresponding to shaft power L3. In subsequent operation, when the water flow rate varies, power is generated in accordance with the variation in a similar way. When the water pump 107, the waterwheel 109, and the electric power generator 134 are simultaneously operated, a curve L4 is obtained. The power supplied from the commercial power source 103 is reduced as much as there is power generated by the electric power generator 134. Point $O_3$ in the diagram indicates a point at which the waterwheel 109 is efficiently operated by a flow rate of $Q_3$ and the electric power generator 134 generates electric power.

In the embodiment, the power collection ratio (L3/L1) is about 40% to about 60% and is improved as compared with the collection ratio of the prior art. In the embodiment, the power generated by the electric power generator 134 is converted by the inverter 135 into a direct current to be supplied to the terminals P and N of the inverter 136 to drive the water pump 107 in a building. However, if the load is driven by an inverter, the power can be supplied not only to the inverter 136, but may also be supplied to any inverter of another facility. Since the terminals P and N of the inverter 135 are connected to the terminals P and N of the inverter 136 using a cable, when the cable becomes long, wiring loss is increased. Both inverters may be collectively arranged in one control board. As a result, the wiring loss can be improved.

As above, when compared with the unused energy collecting apparatus of the prior art using a waterwheel, there is obtained effect of further improvement the collection ratio according to the present invention. Since the present invention can cope with various loads, unused energy of a building can be efficiently re-used.

Since the power generated by the electric power generator is supplied as dc power via an inverter to another inverter, the power is not converted into an alternating current. Therefore, a simple and inexpensive system can be constructed without requiring a system collaboration unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An energy collecting system, comprising:
   a heat storage;
   a heat source for making water filled in said heat storage cool or warm;
   a pump for supplying said water filled in said heat storage to said heat source;
   a first water supply pipe disposed between a discharge outlet of said pump and said heat source;
   a second water supply pipe disposed between a discharge outlet of said heat source and said heat storage;
   a waterwheel provided with said second water supply pipe;
   an AC (alternating current) electric power generator driven by said waterwheel to generate AC electric power;
   an inverter directly connected to an output of said AC electric power generator to receive and convert said AC electric power to DC electric power and to make said AC electric power generator output AC electric power in a desired voltage and a desired frequency; and
   a system collaboration unit for supplying AC electric power supplied from a commercial power source to a load,
   wherein said load is supplied with said AC electric power supplied from said inverter.

2. An energy collecting system according to claim 1, comprising:
   a bypass pipe and a bypass valve for bypassing said waterwheel; and
   pressure sensors disposed at an inlet and an outlet of said water wheel.

3. An energy collecting system, comprising:
   a heat storage;
   a heat source for making water filled in said heat storage cool or warm;

a pump for supplying said water filled in said heat storage to said heat source;

a first water supply pipe disposed between a discharge outlet of said pump and said heat source;

a second water supply pipe disposed between a discharge outlet of said heat source and said heat storage;

a waterwheel provided with said second water supply pipe;

an AC (alternating current) electric power generator driven by said waterwheel to generate AC electric power;

an inverter controlling said AC electric power generator for converting said AC electric power generated by said AC electric power generator to AC electric power of a desired voltage and a desired frequency;

a system collaboration unit for supplying AC electric power supplied from a commercial power source to said heat source;

a cable for connecting an electric path between said system collaboration unit and said heat source to an output port of said inverter;

a bypass pipe and a bypass valve bypassing said waterwheel; and pressure sensors disposed at an inlet and an outlet of said water wheel, wherein said heat source is driven by AC electric power obtained by adding the power generated by said waterwheel to the power of said commercial power source.

4. An energy collecting system, comprising:

a heat storage;

a heat source for making water filled in said heat storage cool or warm;

a pump for supplying said water filled in said heat storage to said heat source;

a first water supply pipe disposed between a discharge outlet of said pump and said heat source;

a second water supply pipe disposed between a discharge outlet of said heat source and said heat storage;

a waterwheel provided with said second water supply pipe;

an AC (alternating current) electric power generator driven by said waterwheel to generate AC electric power;

an inverter controlling said AC electric power generator for converting said AC electric power generated by said AC electric power generator to AC electric power of a desired voltage and a desired frequency;

an AC electric power change-over unit for changing a system from a commercial power source to a load side when power is not being generated, and changing from said AC electric power generator to a load side when power is being generated;

a bypass pipe and a bypass valve bypassing said waterwheel; and pressure sensors disposed at an inlet and an outlet of said water wheel, wherein said AC electric power generated by said AC electric power generator is supplied to a load such as a lighting apparatus in a machine room.

* * * * *